United States Patent
Yamaguchi et al.

(10) Patent No.: US 10,718,348 B2
(45) Date of Patent: Jul. 21, 2020

(54) TURBOMACHINE

(71) Applicant: Hitachi Industrial Products, Ltd., Chiyoda-ku, Tokyo (JP)

(72) Inventors: Kazuyuki Yamaguchi, Tokyo (JP); Tetsuya Yoshida, Tokyo (JP); Taiju Katayama, Tokyo (JP); Hitoshi Yamamoto, Tokyo (JP); Shichao Peng, Tokyo (JP); Takuma Ueno, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 148 days.

(21) Appl. No.: 15/454,865

(22) Filed: Mar. 9, 2017

(65) Prior Publication Data

US 2017/0260991 A1 Sep. 14, 2017

(30) Foreign Application Priority Data

Mar. 10, 2016 (JP) ................................. 2016-046891

(51) Int. Cl.
*F04D 29/10* (2006.01)
*F04D 29/12* (2006.01)
(Continued)

(52) U.S. Cl.
CPC ............. *F04D 29/106* (2013.01); *F04D 1/06* (2013.01); *F04D 29/046* (2013.01);
(Continued)

(58) Field of Classification Search
CPC .... F04D 29/106; F04D 29/669; F04D 29/126; F04D 29/046; F04D 1/06; F04D 29/426;
(Continued)

(56) References Cited

U.S. PATENT DOCUMENTS 1,622,911 A * 3/1927 Carl Huth ............... F16C 33/78
                                                        277/414
3,259,393 A * 7/1966 Dega Robert L .... F16J 15/3244
                                                        277/559
(Continued)

FOREIGN PATENT DOCUMENTS

DE           9001229 U1 *  4/1990
JP        S 53-117158       10/1978
(Continued)

OTHER PUBLICATIONS

Hole-Pattern Seals Performance Evaluation Using Computational Fluid Dynamics and Design of Experiment Techniques; retreived from the internet Jul. 30, 2019; URL: https://www.researchgate.net/publication/260869977_Hole-Pattern_Seals_Performance_Evaluation_Using_Computational_Fluid_Dynamics_and_Design (Year: 2014).*

(Continued)

*Primary Examiner* — Sizo B Vilakazi
*Assistant Examiner* — Brian R Kirby
(74) *Attorney, Agent, or Firm* — Crowell & Moring LLP

(57) ABSTRACT

Leakage of a working fluid from a shaft sealing device of a turbomachine which handles a liquid as the working liquid is reduced and also unstable fluid force which acts on a rotor is reduced. For this purpose, the turbomachine has a rotor having an impeller, a bearing which rotatably supports the rotor, a casing which contains the rotor therein and forms a stationary flow passage, and the shaft sealing device which reduces the leakage of the working fluid through a gap part between the casing and the rotor. The working fluid is a liquid. A plurality of axial grooves which are intermittently arranged in axial direction and circumferential direction of the rotor with a land part being interposed are provided in an inner circumferential surface of the shaft sealing device.

9 Claims, 7 Drawing Sheets

(51) Int. Cl.
    *F04D 29/66*     (2006.01)
    *F16J 15/44*     (2006.01)
    *F04D 1/06*     (2006.01)
    *F04D 29/046*     (2006.01)
    *F04D 29/16*     (2006.01)
    *F04D 29/42*     (2006.01)

(52) U.S. Cl.
    CPC .......... *F04D 29/126* (2013.01); *F04D 29/167* (2013.01); *F04D 29/426* (2013.01); *F04D 29/669* (2013.01); *F16J 15/44* (2013.01)

(58) Field of Classification Search
    CPC ...... F04D 29/167; F16J 15/44; F16J 15/4472; F16J 15/444; F02D 29/126; F02D 29/165; F02D 29/167; F01D 11/00; F01D 11/003; F01D 11/02
    USPC ................ 415/230, 168.2, 173.5, 174.5; 277/410–414
    See application file for complete search history.

(56) References Cited

U.S. PATENT DOCUMENTS

| | | | | |
|---|---|---|---|---|
| 3,529,905 A * | 9/1970 | Meginnis George B | | F01D 11/127 |
| | | | | 415/176 |
| 3,589,739 A * | 6/1971 | Scholten | ............... | F16J 15/3244 |
| | | | | 277/400 |
| 3,861,825 A * | 1/1975 | Blom | ......... | F04D 1/06 |
| | | | | 415/199.3 |
| 4,545,586 A * | 10/1985 | Von Pragenau | ....... | F16J 15/444 |
| | | | | 277/414 |
| 4,927,326 A * | 5/1990 | Von Pragenau | ...... | F01D 11/025 |
| | | | | 415/170.1 |
| 5,190,440 A * | 3/1993 | Maier | ...................... | F01D 11/02 |
| | | | | 277/412 |
| 5,540,447 A * | 7/1996 | Shultz | ..................... | F01D 25/04 |
| | | | | 277/303 |
| 6,039,535 A * | 3/2000 | Kobayashi | ............ | F04D 29/102 |
| | | | | 415/172.1 |
| 7,819,625 B2 * | 10/2010 | Merrill | .................. | F01D 11/122 |
| | | | | 415/170.1 |
| 7,882,632 B2 * | 2/2011 | Yoshida | ................ | F04D 29/108 |
| | | | | 29/447 |
| 8,905,408 B2 * | 12/2014 | Garrison | ................ | F01D 11/02 |
| | | | | 277/348 |
| 9,567,864 B2 * | 2/2017 | Lurisci; Giuseppe | .... | F04D 7/04 |
| 9,709,174 B2 * | 7/2017 | Inoue | .................... | F04D 29/102 |
| | | | | 277/347 |
| 2001/0004436 A1 | 6/2001 | Chasripoor et al. | | |
| 2003/0047880 A1 * | 3/2003 | Ross | ................... | E21B 33/1208 |
| | | | | 277/626 |
| 2006/0267289 A1 * | 11/2006 | Li | ......................... | F04D 29/102 |
| | | | | 277/347 |
| 2007/0257444 A1 * | 11/2007 | Childs | ................... | F16J 15/444 |
| | | | | 277/412 |
| 2008/0206542 A1 * | 8/2008 | Vance | .................. | F01D 11/122 |
| | | | | 428/304.4 |
| 2011/0049809 A1 | 3/2011 | Garrison | | |
| 2014/0191475 A1 * | 7/2014 | Gupta | .................. | F16J 15/4472 |
| | | | | 277/301 |
| 2015/0260294 A1 * | 9/2015 | Nakaniwa | ............... | F01D 11/02 |
| | | | | 277/414 |
| 2015/0337851 A1 * | 11/2015 | Hashizume | ............. | F01D 11/02 |
| | | | | 277/348 |
| 2017/0107996 A1 * | 4/2017 | Rodrigues | ................ | F04D 7/04 |

FOREIGN PATENT DOCUMENTS

| | | |
|---|---|---|
| JP | 61-16294 A | 1/1986 |
| JP | 02-071115 | 5/1990 |
| JP | 10-259799 A | 9/1998 |
| JP | 2010-196797 A | 9/2010 |
| JP | 2011-185272 A | 9/2011 |
| JP | 2014-74360 A | 4/2014 |
| JP | 2014-126139 A | 7/2014 |
| JP | 2014-219023 A | 11/2014 |
| JP | 2014-238066 | 12/2014 |
| WO | WO 2014/077058 A1 | 5/2014 |

OTHER PUBLICATIONS

Japanese-language Office Action issued in counterpart Japanese Application No. 2016-046891 dated Jun. 25, 2019 with English translation (five (5) pages).

Notification of Reasons for Refusal issued in JP Patent Application No. JP2016-046891, dated Jan. 7, 2020, with English translation (7 pages).

\* cited by examiner

TURBOMACHINE

CROSS REFERENCE TO RELATED APPLICATION

This application claims priority to Japanese Patent Application No. JP2016-046891, filed on Mar. 10, 2016, the entire contents of which are incorporated by reference herein.

TECHNICAL FIELD

The present invention concerns a turbomachine and, in particular, relates to a structure of a shaft sealing device which handles a liquid as a working fluid such as a centrifugal pump, a pump turbine and so forth.

BACKGROUND ART

The turbomachine such as the centrifugal pump and so forth is mainly provided with a rotor having an impeller, a bearing which rotatably supports the rotor, a casing which contains therein the rotor and forms a stationary flow passage and so forth. In addition, the impeller imparts a dynamic pressure to the working fluid by rotating the rotor, converts the dynamic pressure into a static pressure at a part on the stationary flow passage which is formed in the casing, and thereby feeds the high-pressure working fluid under pressure to a demander and so forth.

Part of the working fluid which has been sucked into the turbomachine leaks through a gap part between the casing and the rotor. In order to reduce this leakage flow, the shaft sealing device is installed in the gap part between the casing and the rotor.

In a case of the centrifugal pump acting as the turbomachine which handles the liquid as the working fluid, in the centrifugal pump which is described, for example, in Japanese Unexamined Patent Application Publication No. Hei 10-259799 (Patent Literature 1), a so-called labyrinth shaft sealing device that labyrinth grooving has been performed on an inner circumferential surface on the casing (stator) side is provided for the purpose of preventing the working fluid from leaking to the outside through the gap part.

In the labyrinth shaft sealing device which is described in this Japanese Unexamined Patent Application Publication No. Hei 10-259799, a groove part (a circumferential groove) which is arranged in a circumferential direction and whose gap formed together with the impeller side becomes larger and a land part which is arranged in the circumferential direction and whose gap formed together with the impeller becomes smaller are alternately arranged in an axial direction and the leakage flow is reduced by utilizing an energy loss of a flow caused by abrupt expansion of a gap flow passage in the groove part and an energy loss of the flow caused by viscous friction on the land part as shown in FIG. 9 thereof. In addition, a width (a length in the axial direction) of the land part and a width (a length in the axial direction) of the groove part are configured to be almost the same as each other.

Incidentally, in a centrifugal compressor which handles a gas as the working fluid, for example, as indicated in Japanese Unexamined Patent Application Publication No. 2014-74360 (Patent Literature 2), use of a labyrinth seal (a pocket damper shaft sealing device) that a plurality of grooves have been formed in the axial direction and a plurality of pockets have been formed in a circumferential direction of each of the grooves is described (see FIG. 2 and FIG. 3 in Japanese Unexamined Patent Application Publication No. 2014-74360). In addition, it is described in this Japanese Unexamined Patent Application Publication No. 2014-74360 that in the labyrinth seal, simultaneous attainment of a reduction in leakage of the gas through a seal portion of the centrifugal compressor and improvement of damping characteristics at the seal portion is promoted.

PRIOR ART LITERATURE

Patent Literature

[Patent Literature 1] Japanese Unexamined Patent Application Publication No. Hei 10-259799
[Patent Literature 2] Japanese Unexamined Patent Application Publication No. 2014-74360

SUMMARY OF INVENTION

Technical Problem

Since the leakage flow which flows into the labyrinth shaft sealing device turns into a swirling flow which swirls along a rotation direction of the rotor and flows in the axial direction, the unstable fluid force which would further encourage swirling movement in the circumferential direction caused by vibration is generated on a part of the labyrinth shaft sealing device relative to the rotor due to an interaction between this flow and the vibration of the rotor. Therefore, it has been found that the possibility that an unstable vibration may be generated in the rotor becomes large.

Accordingly, in order to prevent this unstable vibration of the rotor, it is effective to promote a reduction in swirling flow in the shaft sealing device and to improve vibration damping property of the shaft sealing device. However, in the labyrinth shaft sealing device described in Japanese Unexamined Patent Application Publication No. Hei 10-259799, since the circumferential grooves are made to communicate with one another in the circumferential direction and the working fluid which has flown into the grooves when displacing the rotor escapes in the circumferential direction, there is the possibility that the vibration damping property of the shaft sealing device may be reduced. In addition, since the circumferential grooves are made to communicate with one another in the circumferential direction, the swirling flow which has flown into the shaft sealing device flows without being suppressed and therefore there is the possibility that the unstable fluid force may be increased.

The pocket damper shaft sealing device described in the above-mentioned Patent Literature 2 is provided with a plurality of grooves which are arranged in parallel with one another and intermittently in the circumferential direction of the rotor and each of the grooves has a pocket structure owing to which the groove does not communicate with other grooves in the circumferential direction. Therefore, in the working fluid which has flown into the pockets, an amount of the working fluid which escapes in the circumferential direction when displacing the rotor is reduced and therefore the vibration damping property of the shaft sealing device is improved. In addition, since the grooves which are formed in the circumferential direction do not communicate with one another, the swirling flow which would cause generation of the unstable fluid force is suppressed and also the unstable fluid force is reduced.

However, the pocket damper shaft sealing device described in this Patent Literature 2 is the shaft sealing device for the gas as illustrated in FIG. 2 thereof and a part corresponding to the land part described in Japanese Unexamined Patent Application Publication No. Hei 10-259799 is formed into a fin-shape which is very thin in width and also a pitch between the ports corresponding to the land parts is made short.

When adopting such a shaft sealing device for the gas as mentioned above as the shaft sealing device for a turbomachine which handles a liquid which is higher in viscosity than the gas, since the width of the part corresponding to the land part is thin, it becomes difficult to sufficiently utilize an energy loss effect which is brought about by the viscous friction of the working fluid and therefore there is the possibility that the leakage flow may not be sufficiently reduced.

An object of the present invention is to obtain a turbomachine which is capable of reducing leakage of the working fluid and capable of also reducing the unstable fluid force which acts on a rotor in a shaft sealing device for the turbomachine which handles a liquid as the working fluid.

Solution to Problem

In order to attain the above-mentioned object, the present invention has one feature that a turbomachine includes a rotor having an impeller, a bearing which rotatably supports the rotor, a casing which contains the rotor therein and forms a stationary flow passage, and a shaft sealing device which reduces leakage of a working fluid through a gap part between the casing and the rotor, in which the working fluid is a liquid and a plurality of axial grooves which have been intermittently arranged in an axial direction and a circumferential direction of the rotor with a land part being interposed between the adjacent axial grooves are provided in an inner circumferential surface of the shaft sealing device.

Another feature of the present invention is that a turbomachine includes a rotor having an impeller, a bearing which rotatably supports the rotor, a casing which contains the rotor therein and forms a stationary flow passage and a shaft sealing device which reduces leakage of a working fluid through a gap part between the casing and the rotor, in which the working fluid is a liquid, an axial groove group which includes a plurality of axial grooves which have been intermittently arranged on the same straight line directed in an axial direction with a land part being interposed between the adjacent axial grooves is provided in an inner circumferential surface of the shaft sealing device, and a plurality of the axial groove groups are adjacently arranged in the circumferential direction, and the plurality of axial groove groups which have been adjacently arranged in the circumferential direction are arranged so as to be parallel with one another with the land part being interposed between the adjacent axial groove groups.

Advantageous Effects of Invention

According to the present invention, there is an advantageous effect that it is possible to obtain the turbomachine which is capable of reducing the leakage of the working fluid in the shaft sealing device for the turbomachine which handles the liquid as the working fluid and is also capable of reducing the unstable fluid force which acts on the rotor.

DESCRIPTION OF EMBODIMENTS

In the following, specific embodiments of the turbomachine of the present invention will be described on the basis of the appended drawings. In the respective drawings, parts designated by the same numerals indicate the same or corresponding parts.

Embodiment 1

The embodiment 1 of a turbomachine of the present invention will be described using FIG. 1 to FIG. 3.

Figure 1:
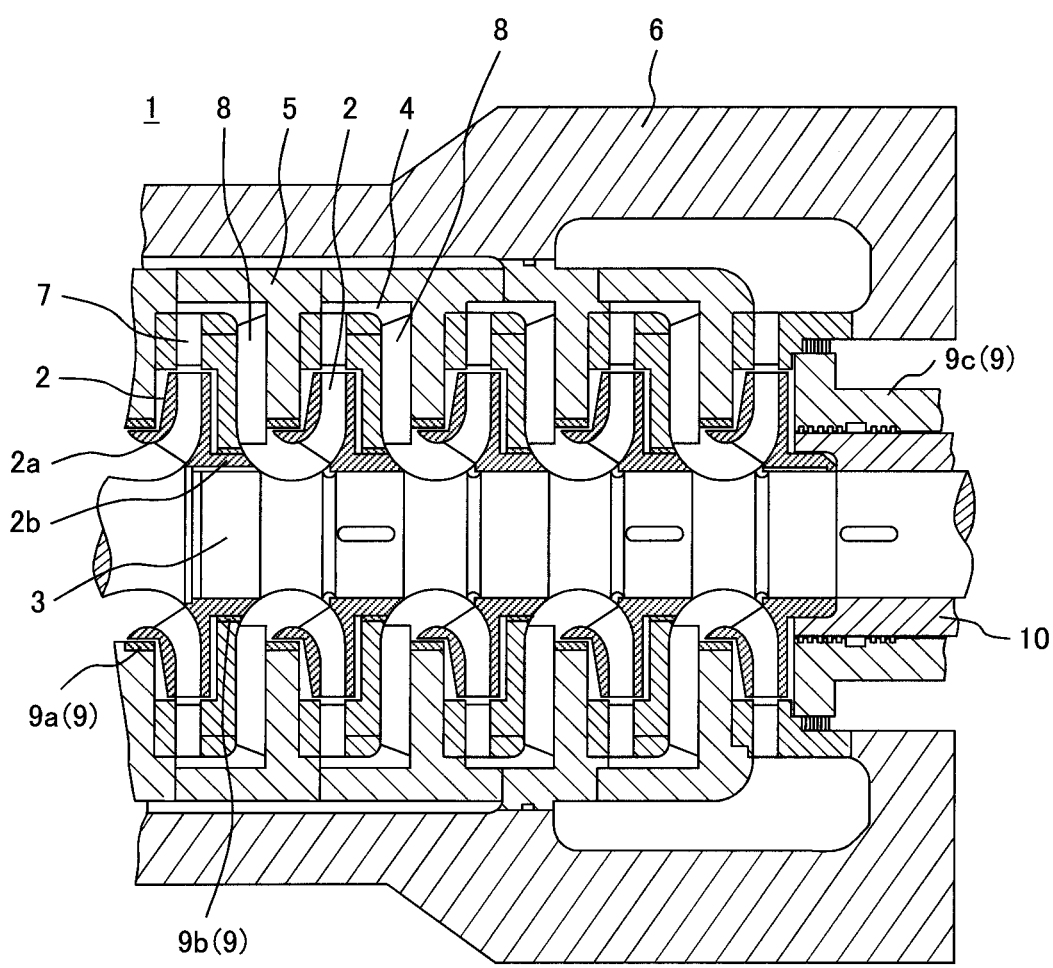
FIG. 1 is a partial longitudinal sectional diagram illustrating an embodiment 1 of a turbomachine of the present invention.

FIG. 1 is a partial longitudinal sectional diagram illustrating a uniaxial multistage centrifugal pump as a turbomachine 1 of the present invention. First, an overall configuration of the turbomachine 1 of the present embodiment 1 will be described with reference to FIG. 1. Incidentally, as the uniaxial multistage centrifugal pump, for example, a boiler feed pump and so forth are available.

In FIG. 1, the turbomachine 1 of the present embodiment is configured by a rotor 3 having an impeller 2, a bearing (not illustrated) which rotatably supports this rotor 3, an inner-side casing (an inner casing) 5 which contains the rotor 3 therein and forms a stationary flow passage 4, an outer-side casing (an outer casing) 6 which contains the inner-side casing 5 therein and so forth. The stationary flow passage 4 is provided with a diffuser vane 7 which has been provided on the discharge side of the impeller 2 and a return vane 8 which has been provided on the next-stage impeller 2 side.

In addition, a wearing ring 9a is provided on an inner surface of a stationary part (an inner surface of the casing 5 in this example) which faces an outer circumferential surface of a mouth ring part 2a of the impeller 2 and this wearing ring 9a configures one labyrinth shaft sealing device 9 which seals a gap between the mouth ring part 2a of the impeller 2 and the stationary part.

A cylindrical part 2b is provided on the rear face side of the impeller 2, a stage bush 9b is provided on the inner surface of the stationary part (the inner surface of the casing 5) which faces an outer circumferential surface of this cylindrical part 2b, and this stage bush 9b configures another labyrinth shaft sealing device 9 which seals a gap between the cylindrical part 2b of the impeller 2 and the stationary part.

10 denotes a balance drum adapted to achieve a balance of thrust force which acts on the rotor 3, a balance drum shaft sealing device 9c is provided on the inner surface of the stationary part (the inner surface of the casing 5 or 6) which faces an outer circumferential surface of this balance drum 10, and this balance drum shaft sealing device 9c configures a further labyrinth shaft sealing device 9 which seals a gap between the balance drum 10 and the stationary part.

Next, an operation of the turbomachine 1 which is configured as mentioned above will be described. The working fluid (a liquid such as water and so forth in this example) is sucked into the impeller 2 by rotating the rotor 3, is discharged onto the stationary flow passage 4 by being applied with a dynamic pressure by this impeller 2 and the dynamic pressure so applied is converted into a static pressure on the stationary flow passage 4 which is provided with the diffuser vane 7 and the return vane 8. Thereby, the working fluid turns into the high-pressure working fluid, the pressure of the high-pressure working fluid is increased as the fluid sequentially flows into the next-stage impeller 2, and the high-pressure working fluid which has been discharged from the final-stage impeller 2 is fed to the demander and so forth under pressure.

Part of the working fluid which flows through within the turbomachine 1 leaks to the outside through the gap parts between the stationary part such as the casing 5 and so forth and the rotor 3, that is, the gap between the outer circumferential surface of the mouth ring part 2a of the impeller 2 and the stationary part, the gap between the outer circumferential surface of the cylindrical part 2b of the impeller 2 and the stationary part, the gap between the outer circumferential surface of the balance drum 10 and the stationary part and so forth which have been described before.

The labyrinth shaft sealing devices 9 are respectively provided in the aforementioned respective gap parts in order to reduce these leakage flows. That is, the wearing ring 9a is provided on the mouth ring part 2a at the entrance of the impeller 2, the stage bush 9b is provided on the cylindrical part 2b on the rear face of the impeller 2, and the balance drum shaft sealing device 9c is provided on a part of the balance drum 10 on the rear face of the final-stage impeller 2 respectively.

Next, configurations of these shaft sealing devices will be described using FIG. 2 and FIG. 3. FIG. 2 is a diagram illustrating the inner surface shape of the shaft sealing device in the turbomachine 1 illustrated in FIG. 1, that is, a main part development diagram illustrating the shaft sealing device 9 by developing the shaft sealing device 9 in the circumferential direction, and FIG. 3 is a sectional diagram on arrow along the line in FIG. 2. An arrow which indicates the circumferential direction matches a rotation direction. The same shall apply hereinafter. In addition, the leakage flow has a swirling component and therefore flows into the device 9 in a state of inclining from the axial direction to the circumferential direction.

Incidentally, as the labyrinth shaft sealing devices 9 which are provided in the turbomachine 1, the wearing ring 9a which has been provided on the mouth ring part 2a at the entrance of the impeller 2, the stage bush 9b which has been provided on the cylindrical part 2b on the rear face of the impeller 2, and the balance drum shaft sealing device 9c which has been provided on the part of the balance drum 10 on the rear face of the final-stage impeller 2 are provided as described before. In the present embodiment, the inner surface shapes of the above-mentioned shaft sealing devices 9a to 9c are made the same as one another and the shaft sealing device 9 illustrated in FIG. 2 and FIG. 3 has a structure which is commonly applied to the wearing ring 9a, the stage bush 9b, and the balance drum shaft sealing device 9c which have been described above. Therefore, in the following, the shaft sealing devices 9a, 9b and 9c will be described simply as the shaft sealing device (or the labyrinth shaft sealing device) 9.

Figure 2:
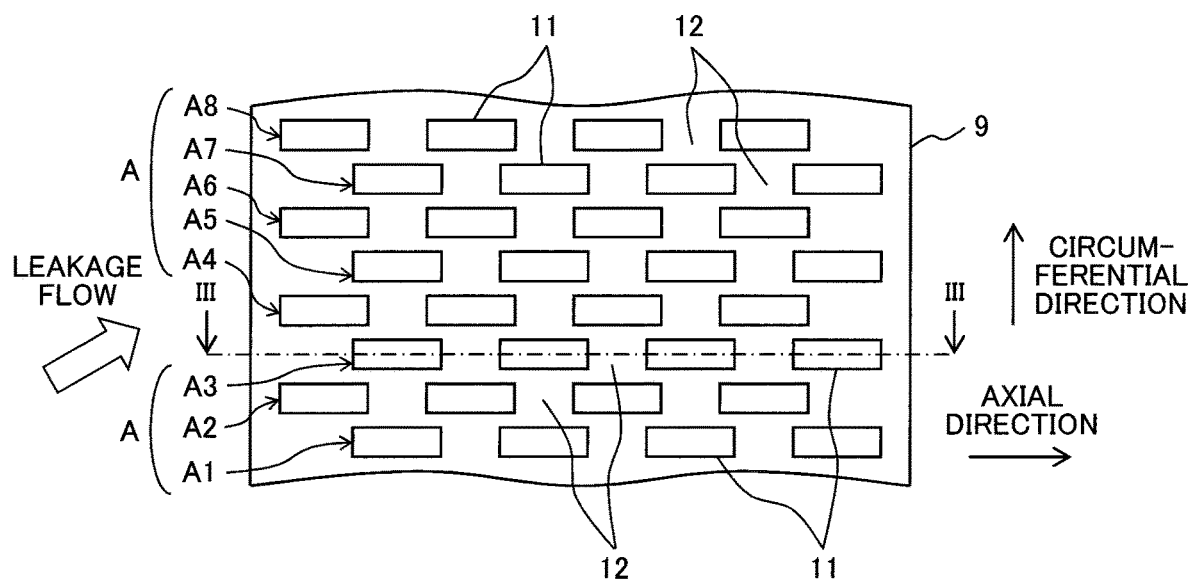
FIG. 2 is a diagram illustrating an inner surface shape of a shaft sealing device in the turbomachine illustrated in FIG. 1, that is, the main part development diagram illustrating the shaft sealing device by developing the device in a circumferential direction.

As illustrated in FIG. 2, many grooves which are parallel with the axial direction of the rotor 3, that is, axial grooves 11 are provided in an inner surface of the shaft sealing device 9 in the present embodiment 1. Describing in more detail, an axial groove group A (A1, A2, A3, . . . and A8) which has been configured by a plurality (four grooves in this example) of the axial grooves 11 which have been intermittently arranged on the same straight line which is parallel with the axial direction of the rotor 3 with a land part 12 being interposed between the adjacent grooves 11 is provided in the inner surface of the shaft sealing device 9. The axial groove groups A are adjacently arranged in a plurality of lines in the circumferential direction of the inner surface of the shaft sealing device 9. In the example illustrated in FIG. 2, eight axial groove groups A1, A2, . . . and A8 are provided in the circumferential direction in an illustrated range thereof as the plurality of lines of the axial groove groups which have been adjacently arranged in the circumferential direction. In addition, the plurality of axial groove groups A1, A2, . . . and A8 which have been adjacently arranged in the circumferential direction are arranged to be parallel with or almost parallel with one another.

In addition, in the example illustrated in FIG. 2, the plurality of axial grooves 11 which configure the shaft sealing device 9 are provided so as to form a staggered arrangement that the positions of the adjacent grooves deviate from each other in both of the circumferential direction and the axial direction of the rotor. Further, the plurality of axial grooves 11 which are arranged in a staggered state each is formed into a rectangular shape that a length in the axial direction becomes longer than a length in the circumferential direction, the plurality of axial grooves 11 are arranged so as to partially overlap one another in the circumferential direction, and the respective axial grooves 11 in each of the axial direction groove groups A1, A2, . . . and A8 are configured so as to not overlap the axial grooves 11 in the other axial groove groups in the axial direction.

Figure 3:
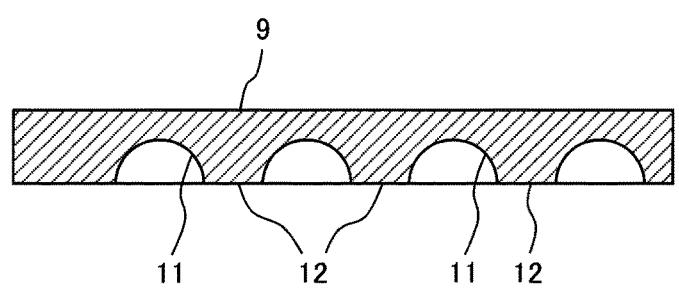
FIG. 3 is a sectional diagram on arrow along the line in FIG. 2.

It is possible to easily machine each of the axial grooves 11 which are provided in the shaft sealing device 9 by pressing a circular tool such as, for example, an end mil and so forth against the inner surface of the shaft sealing device 9, and it is possible to form semi-circular (an arc-shaped) grooves which are parallel with one another in the axial direction by a plural number and intermittently with ease as illustrated in FIG. 3. A length of the land part 12 which is favorable in a case of handling the liquid as the working fluid is sufficiently ensured by intermittently forming the axial grooves 11 and thereby it becomes possible to produce with ease the shaft sealing device 9 that the land part 12 has a thickness. It becomes possible to effectively reduce an amount of the leakage flow which leaks from the shaft sealing device in the axial direction by sufficiently ensuring the length of the land part 12.

On the other hand, owing to provision of a configuration that many axial grooves 11 which are long in the axial direction and short in the circumferential direction have been arranged in the circumferential direction in the inner surface of the shaft sealing device 9, it is possible to reduce an amount of the working fluid which escapes in the circumferential direction when displacing the rotor 3, in the working fluid which has flown into the axial grooves 11, and thereby it is possible to improve the vibration damping property of the shaft sealing device 9.

In addition, since the plurality of axial groove groups A (A1, A2, . . . and A8) are arranged in the circumferential direction in the inner surface of the shaft sealing device 9 and the respective axial grooves 11 in the respective axial groove groups A are arranged in the staggered state so as to partially overlap one another in the circumferential direction, the leakage flow alternately passes over parts of the land parts 12 and the axial grooves 11. Therefore, it is possible to effectively suppress a swirling-direction flow which would cause generation of the unstable fluid force.

That is, since it is possible to suppress flowing of the leakage flow which flows into the shaft sealing device 9 in the axial direction by turning into the swirling flow which swirls along the rotation direction of the rotor 3, it is possible to reduce generation of the unstable flow force which would further encourage the swirling movement which works in the circumferential direction due to vibration relative to the rotor 3 and thereby it is possible to suppress generation of an unstable vibration in the rotor 3.

Moreover, according to the present embodiment, although most of the leakage flow which is directed in the axial direction alternately passes over the parts of the land parts 12 and the axial grooves 11, the land part 12 has a sufficient thickness (for example, a thickness which corresponds to at least a half of the length of the axial groove 11) in the axial direction and therefore the viscous friction generated when the leakage flow flows over this land part 12 becomes large and it is also possible to reduce the axial-direction flow owing to abrupt expansion of the leakage flow passage when the leakage flow flows into the axial groove 11.

Incidentally, since the axial groove 11 in the above-mentioned present embodiment 1 is formed into the rectangular shape that the length in the axial direction becomes longer than the length in the circumferential direction, it is possible to more increase the effect of suppressing turning of the leakage flow which has flown into the shaft sealing device 9 into the swirling flow. However, an aspect ratio of the axial-direction width to the circumferential-direction width of the axial groove 11 is not limited to the aspect ratio which allows formation of the axial groove into the rectangular shape which is long in the axial direction and the shape of the groove may be appropriately selected in accordance with the shape of the tool used for forming the axial grooves 11 and, for example, the axial-direction width and the circumferential-direction width of the axial groove 11 may be configured to be almost the same as each other.

In addition, although it is preferable to apply the above-mentioned shaft sealing device 9 to all of the shaft sealing devices 9 (the wearing ring 9a, the stage bush 9b and the balance drum shaft sealing device 9c) of the turbomachine 1, the above-mentioned shaft sealing device 9 may be applied to at least one of the shaft sealing devices 9 and it is effective to apply the present invention, in particular, to the shaft sealing device 9 for a high-pressure part that the unstable fluid force and the leakage amount become large.

Next, modified examples of the turbomachine 1 of the above-mentioned embodiment 1 will be described using FIG. 4 to FIG. 13. Since, in the respective drawings, the parts to which the same numerals as those in FIG. 1 to FIG. 3 are assigned indicate the same or corresponding parts and the overall configuration of the turbomachine 1 is the same as the configuration in FIG. 1 which has been described in the above-mentioned embodiment 1, description of the overall configuration of the turbomachine 1 is omitted and only parts which are different in configuration from those in FIG. 1 to FIG. 3 in the shaft sealing device 9 will be described.

Figure 4:
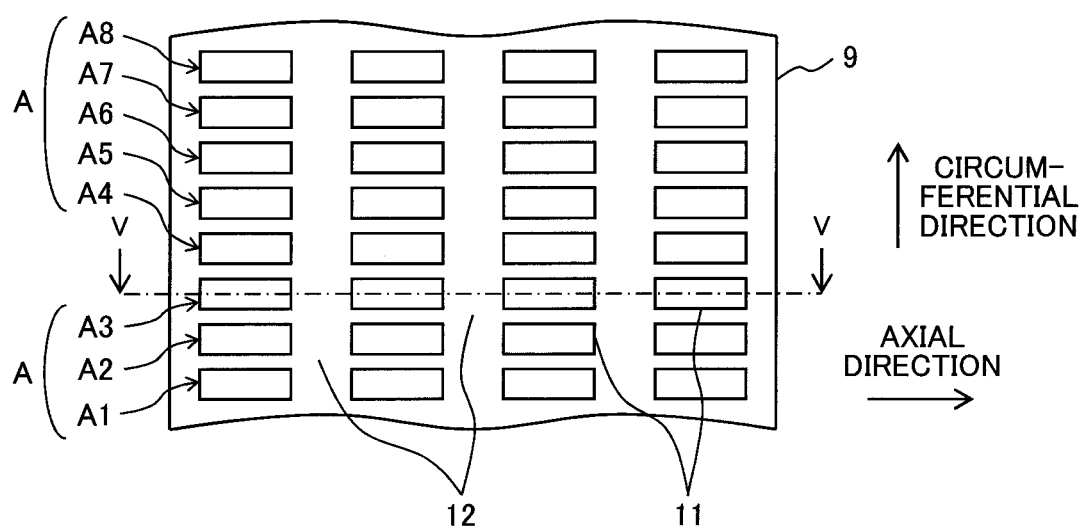
FIG. 4 is a diagram illustrating a first modified example of the shaft sealing device in the turbomachine illustrated in FIG. 1, that is, the diagram corresponding to the diagram in FIG. 2.
Figure 5:
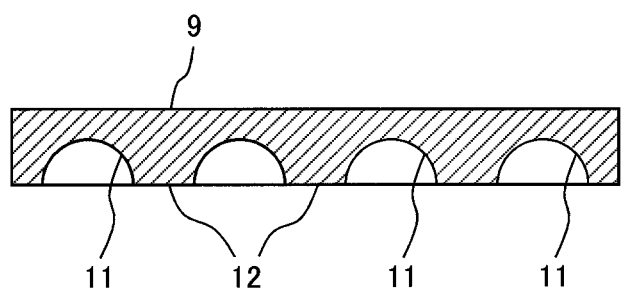
FIG. 5 is a sectional diagram on arrow along the V-V line in FIG. 4.

A first modified example of the shaft sealing device 9 in the above-mentioned embodiment 1 will be described with reference to FIG. 4 and FIG. 5. FIG. 4 is a diagram illustrating the first modified example of the shaft sealing device in the turbomachine illustrated in FIG. 1, that is, the diagram which corresponds to FIG. 2, and FIG. 5 is a sectional diagram on arrow along the V-V line in FIG. 4.

While in the example illustrated in FIG. 2, the plurality of axial grooves 11 which configure the shaft sealing device 9 are provided to be arranged in the staggered state in both of the circumferential direction and the axial direction of the rotor 3, in this first modified example, the plurality of axial grooves 11 which are parallel with one another in the axial direction and are formed into the rectangular shape are arrayed in a grid form that the positions of the adjacent axial grooves become the same as each other (that is, are on the same straight line) as illustrated in FIG. 4.

In the present embodiment, the axial grooves 11 may be arrayed in the grid form in this way. In this case, since the plurality of axial grooves 11 are arranged side by side (on the same straight line) respectively in the axial direction and in the circumferential direction, each land part 12 which is the part where the axial grooves 11 are not present is formed continuously (that is, so as to extend) in the circumferential direction. For this reason, the effect of suppressing turning of the leakage flow which flows into the shaft sealing device 9 into the swirling flow which swirls along the rotation direction of the rotor is reduced. However, work for positioning the tool and the material when machining the axial grooves 11 is reduced owing to provision of the configuration of this first modified example and therefore it is possible to obtain an effect of greatly improving productivity.

Figure 6:
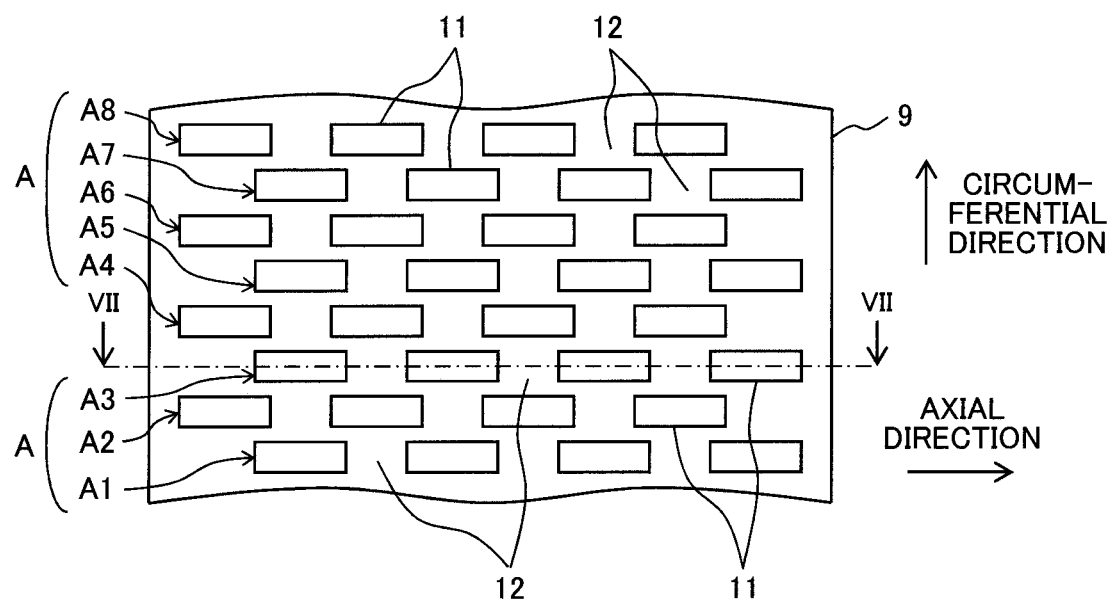
FIG. 6 is a diagram illustrating a second modified example of the shaft sealing device in the turbomachine illustrated in FIG. 1, that is, the diagram corresponding to the diagram in FIG. 2.

A second modified example of the shaft sealing device 9 in the above-mentioned embodiment 1 will be described with reference to FIG. 6 and FIG. 7. FIG. 6 is a diagram illustrating the second modified example of the shaft sealing device in the turbomachine illustrated in FIG. 1, that is, the diagram which corresponds to FIG. 2 and FIG. 7 is a sectional diagram on arrow along the VII-VII line in FIG. 6.

Figure 7:
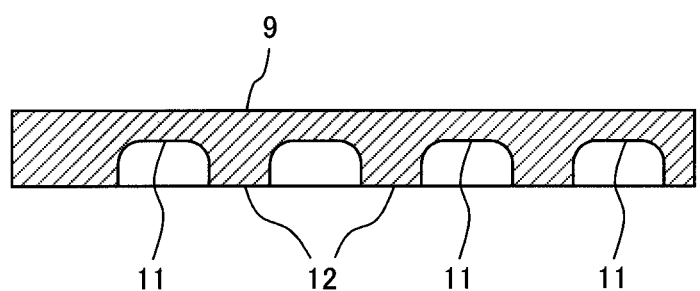
FIG. 7 is a sectional diagram on arrow along the VII-VII line in FIG. 6.

While the example that the axial-direction section of the axial groove 11 which is long in the axial direction has been formed into the semicircular arc-shape is illustrated in FIG. 2, in this second modified example, the axial-direction section of the axial groove 11 is formed into an almost rectangular shape as illustrated in FIG. 7. It is possible to form the axial-direction section of the axial groove 11 into shapes other than the arc shape in this way, such as, for example, a rectangular shape, an elliptical shape, a trapezoidal shape, a triangular shape and so forth, not limited to the arc shape and the leakage flow reduction effect and the unstable fluid force reduction effect which are the same as the above are obtained. Incidentally, such an advantage that it is possible to easily perform machining of each axial groove 11 is obtained by forming the axial-direction section of each axial groove 11 into the arc shape as illustrated in FIG. 3.

Figure 8:
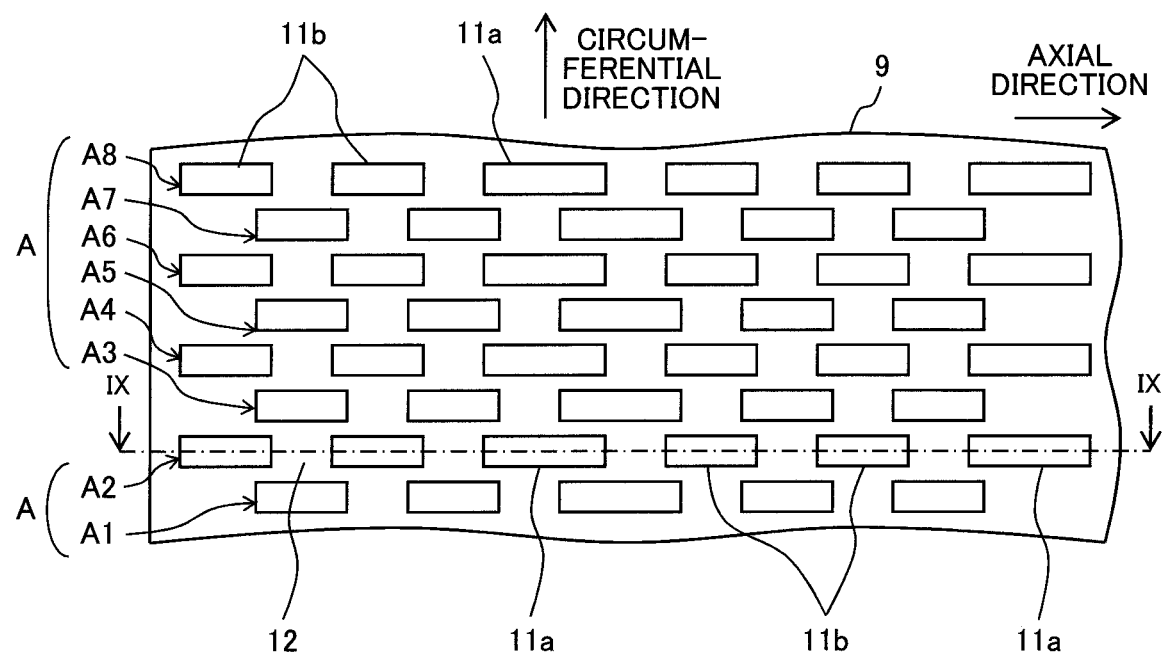
FIG. 8 is a diagram illustrating a third modified example of the shaft sealing device in the turbomachine illustrated in FIG. 1, that is, the diagram corresponding to the diagram in FIG. 2.

A third modified example of the shaft sealing device 9 in the above-mentioned embodiment 1 will be described with reference to FIG. 8 and FIG. 9. FIG. 8 is a diagram illustrating the third modified example of the shaft sealing device in the turbomachine illustrated in FIG. 1, that is, the diagram which corresponds to FIG. 2 and FIG. 9 is a sectional diagram on arrow along the IX-IX line in FIG. 8.

Figure 9:
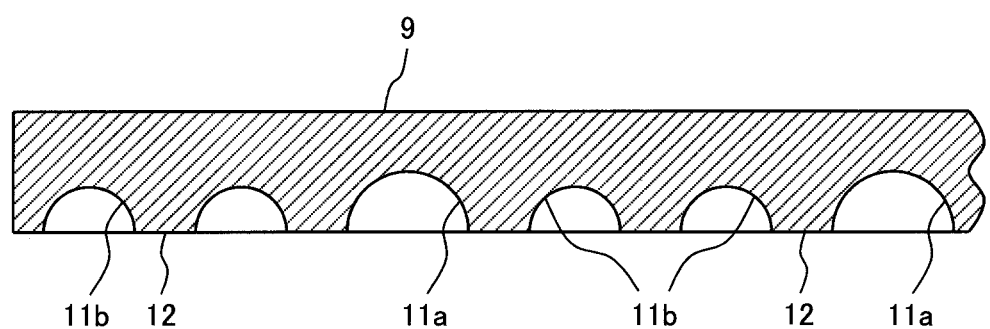
FIG. 9 is a sectional diagram on arrow along the IX-IX line in FIG. 8.

While the examples that the axial grooves 11 of the same shape and the same size have been provided in the shaft sealing devices 9 have been described in the above-mentioned FIG. 2 to FIG. 7, in this third modified example, the axial grooves 11 are configured by two kinds of the grooves, that is, a large groove 11a which is large in axial-direction and radial-direction sizes and a small groove 11b which is small in the axial-direction and radial-direction sizes as illustrated in FIG. 8 and FIG. 9. It is favorable to arrange the large grooves 11a one by one every time several small groves 11b are arranged in the axial direction. In the example illustrated in FIG. 8 and FIG. 9, the axial grooves 11a and 11b are configured such that the large groove 11a is arranged one by one every time the small grooves 11b are arranged two by two in the axial direction. Also the respective axial groove groups A1, A2, . . . and A8 which are arranged in the plural number in the circumferential direction are configured in the same way.

Since it is possible for the large grooves 11a to more effectively suppress growing of the swirling flow which is the cause for generation of the unstable fluid force by obstructing uniformity of the flow, it is possible to improve the effect of reducing the unstable fluid force. Incidentally, the number of the kinds of the axial grooves 11 is not limited to two and three or more kinds of axial grooves which are different from one another in axial-direction and radial-direction sizes may be configured as the axial grooves 11.

Figure 10:
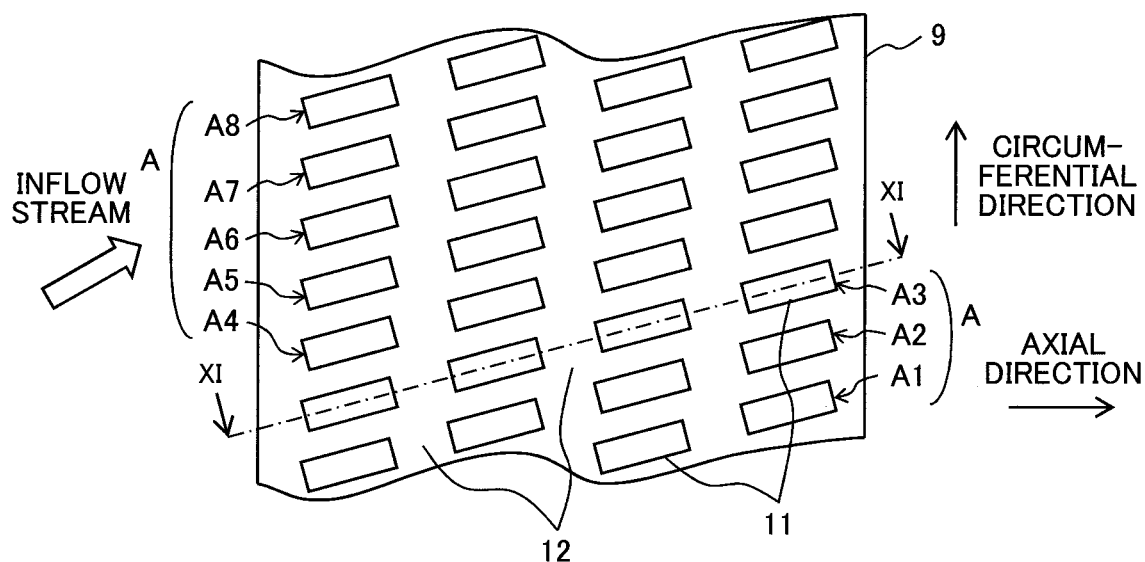
FIG. 10 is a diagram illustrating a fourth modified example of the shaft sealing device in the turbomachine illustrated in FIG. 1, that is, the diagram corresponding to the diagram in FIG. 2.
Figure 11:
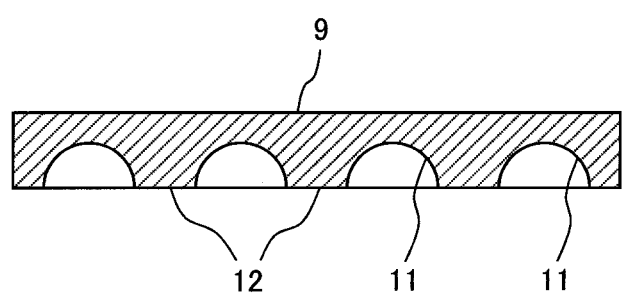
FIG. 11 is a sectional diagram on arrow along the XI-XI line in FIG. 10.

A fourth modified example of the shaft sealing device 9 in the above-mentioned embodiment 1 will be described with reference to FIG. 10 and FIG. 11. FIG. 10 is a diagram illustrating the fourth modified example of the shaft sealing device 9 in the turbomachine 1 illustrated in FIG. 1, that is, the diagram which corresponds to FIG. 2 and FIG. 11 is a sectional diagram on arrow along the XI-XI line in FIG. 10.

The examples that the aforementioned axial grooves 11 are formed as the grooves which are parallel with one another in the axial direction and also the respective axial groove groups A1, A2, . . . and A8 which are provided in the plural number in the circumferential direction are arranged in parallel with one another respectively in the axial direction have been described in the shaft sealing devices 9 illustrated in the above-mentioned FIG. 2 to FIG. 9. In contrast, in this fourth modified example, the axial grooves 11 are provided by inclining them from the axial direction to the rotation direction (the circumferential direction) of the motor 3 and also the respective axial groove groups A1, A2, . . . and A8 which are provided in the plural number in the circumferential direction are arranged so as to be parallel with one another by respectively inclining the axial groove groups from the axial direction to the rotation direction of the rotor 3.

Since it is possible to proximate the direction that the axial grooves 11 are directed to the direction that the leakage flow flows into the shaft sealing device 9 by inclining the axial grooves 11 and the axial groove groups A1, A2, . . . and A8 which configure the shaft sealing device 9 from the axial direction to the rotation direction of the rotor 3 in this way, it is possible to more effectively decelerate a flow velocity of the leakage flow. Accordingly, it is possible to more reduce the leakage flow and it is also possible to effectively suppress the unstable fluid force.

Incidentally, since it is desirable for the shaft sealing device 9 to suppress the leakage flow as much as possible, it is preferable that an angle formed by the direction that the axial grooves 11 are directed or the direction that the axial groove groups A1, A2, . . . and A8 are directed and the axial direction of the rotor 3 be less than about 45 degrees, that is, an angle formed by the direction that the axial grooves 11 are directed or the direction that the axial groove groups A1, A2, . . . and A8 are directed and the rotation direction of the rotor 3 be at least about 45 degrees. In addition, in the description of the present invention, the grooves and the groove groups whose angle relative to the axial direction of the rotor 3 is less than about 45 degrees are also called the axial grooves and the axial groove groups respectively.

Figure 12:
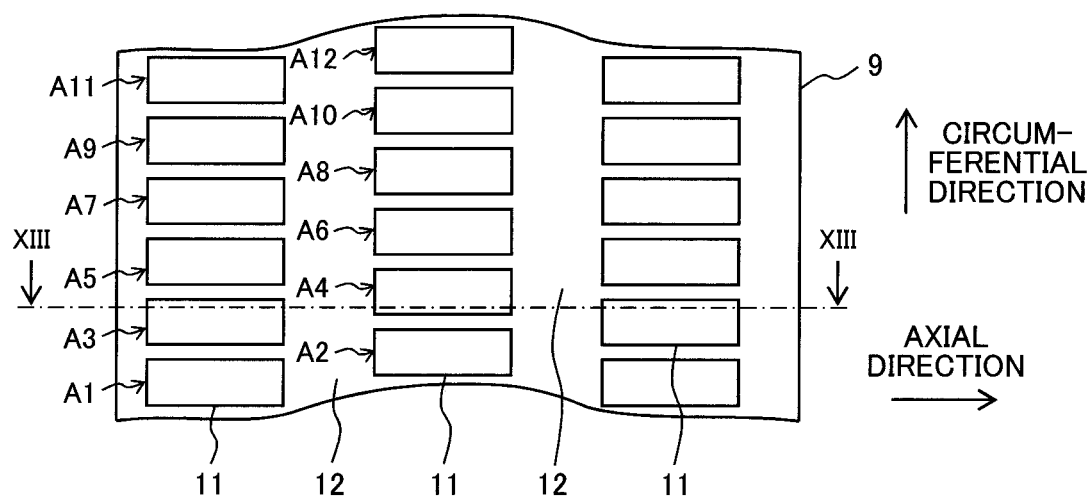
FIG. 12 is a diagram illustrating a fifth modified example of the shaft sealing device in the turbomachine illustrated in FIG. 1, that is, the diagram corresponding to the diagram in FIG. 2.
Figure 13:
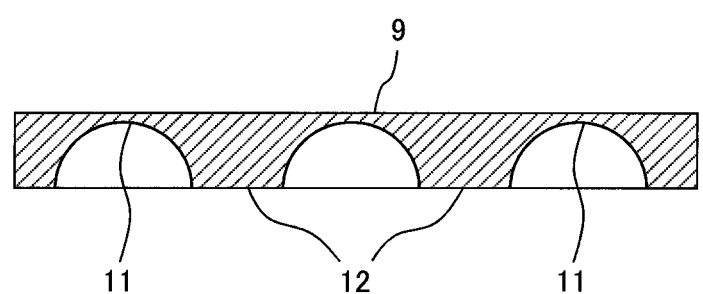
FIG. 13 is a sectional diagram on arrow along the XIII-XIII line in FIG. 12.

A fifth modified example of the shaft sealing device 9 in the above-mentioned embodiment 1 will be described with reference to FIG. 12 and FIG. 13. FIG. 12 is a diagram illustrating the fifth modified example of the shaft sealing device in the turbomachine illustrated in FIG. 1, that is, the diagram which corresponds to FIG. 2 and FIG. 13 is a sectional diagram on arrow along the XIII-XIII line in FIG. 12.

The fifth modified example is an example that the aforementioned shaft sealing device 9 of the embodiment 1 illustrated in FIG. 2 and FIG. 3 is partially modified, the basic configuration thereof is the same as that illustrated in FIG. 2 and FIG. 3 and therefore description will be made focusing on different points.

In the fifth modified example, the plurality of axial grooves 11 are the same as those in the example illustrated in FIG. 2 and FIG. 3 in the point that the plurality of axial grooves 11 are arranged in the staggered state in the axial direction of the rotor 3. However, while in the example illustrated in FIG. 2 and FIG. 3, the axial grooves 11 which are arranged on the same straight line in the axial direction are configured so as not overlap the axial grooves 11 on another same straight line, in the fifth modified example, the axial grooves 11 which are arranged on the same straight line in the axial direction are configured so as to partially overlap the other axial grooves 11 which are arranged adjacently to the above-mentioned axial grooves 11 in the circumferential direction or the axial grooves 11 which are arranged on another same straight line.

Describing with reference to FIG. 12, for example, the axial grooves 11 in the axial groove group A1 are arranged so as to partially overlap the axial grooves 11 in the axial groove group A2 (in the example in FIG. 12, only one groove is illustrated) which is adjacent to the axial groove group A1 in the circumferential direction. The same applies to other axial groove groups A3 to A12. In addition, the respective axial grooves 11 in one of the aforementioned respective axial groove groups A1 to A12 are configured so as not to overlap, in the circumferential direction, the axial grooves 11 in another one of the axial groove groups A1 to A12 which is adjacent to the above-mentioned axial groove group in the circumferential direction. Accordingly, in this fifth modified example, each land part 12 is provided continuously (that is, so as to extend) in the circumferential direction. Other configurations are the same as those of the example illustrated in FIG. 2 and FIG. 3.

According to the fifth modified example, the axial grooves 11 are configured so as to partially overlap one another in the axial direction and therefore an effect of more reducing the leakage flow in the axial direction is obtained.

As described above, according to the embodiment and the respective modified examples which have been described above, since in the shaft sealing device, the plurality of axial grooves 11 which have been intermittently arranged in the axial direction and the circumferential direction of the rotor with the land part being interposed between the adjacent axial grooves 11 are provided in the inner circumferential surface thereof, it is possible to obtain the turbomachine which is capable of reducing the leakage of the working fluid in the shaft sealing device of the turbomachine which handles the liquid as the working fluid and is also capable of reducing the unstable fluid force which acts on the rotor.

Incidentally, the present invention is not limited to the above-mentioned embodiment and various modified examples are included. For example, although in the above-mentioned embodiment, the case where the present invention has been applied to the uniaxial multistage centrifugal pump as the turbomachine has been described by way of example, the present invention is not limited to the uniaxial multistage centrifugal pump and is also applicable to a single-stage centrifugal pump, a reversible pump turbine, a hydraulic turbine and so forth similarly.

In addition, it is also possible to replace part of the configuration of the embodiment or each of the modified examples which have been described above with the configuration of another modified example and it is also possible to add the configuration of another modified example to the configuration of the embodiment or one of the modified examples which have been described above. Further, the above-mentioned embodiment has been described for comprehensibly describing the present invention and is not necessarily limited to the turbomachine which includes all of the configurations which have been described above.

What is claimed is:

1. A turbomachine comprising:
a rotor having an impeller;
a bearing which rotatably supports the rotor;
a casing which contains the rotor therein and forms a stationary flow passage; and
a shaft sealing device which reduces leakage of a working fluid through a gap part between the casing and the rotor, wherein
the working fluid is a liquid,
a plurality of rectangular axial grooves which have been intermittently arranged in an axial direction and a circumferential direction of the rotor with a land part having a thickness corresponding to at least half of a length of the rectangular axial grooves being axially interposed between adjacent rectangular axial grooves are provided in an inner circumferential surface of the shaft sealing device, and
the land part extends continuously in the circumferential direction so as to axially separate sets of the adjacent rectangular axial grooves that are aligned in the circumferential direction.

2. The turbomachine according to claim 1, wherein
each of the rectangular axial grooves is configured in a rectangular shape which is long in the axial direction and the plurality of rectangular axial grooves are arranged in parallel with one another.

3. A turbomachine comprising:
a rotor having an impeller;
a bearing which rotatably supports the rotor;
a casing which contains the rotor therein and forms a stationary flow passage; and
a shaft sealing device which reduces leakage of a working fluid through a gap part between the casing and the rotor, wherein
the working fluid is a liquid,
an axial groove group which includes a plurality of rectangular axial grooves which have been intermittently arranged on the same straight line directed in an axial direction with a land part having a thickness corresponding to at least half of a length of the rectangular axial grooves being interposed between the adjacent rectangular axial grooves is provided in an inner circumferential surface of the shaft sealing device,
a plurality of the axial groove groups are adjacently arranged in a circumferential direction of the rotor,
the plurality of axial groove groups which have been adjacently arranged in the circumferential direction are arranged so as to be parallel with one another with the land part being interposed between the adjacent axial groove groups, and
the land part extends continuously in the circumferential direction so as to axially separate sets of the adjacent rectangular axial grooves that are aligned in said circumferential direction.

4. The turbomachine according to claim 3, wherein
the plurality of rectangular axial grooves are arrayed in a grid form.

5. The turbomachine according to claim 3, wherein
a shape of an axial section of each of the rectangular axial grooves is configured in an arc shape or an almost rectangular shape.

6. The turbomachine according to claim 3, wherein
the rectangular axial grooves are provided by inclining the rectangular axial grooves from the axial direction to a rotation direction of the rotor, and the respective axial groove groups which are arranged in a plural number in the circumferential direction are arranged so as to be parallel with one another by respectively inclining the axial groove groups from the axial direction to the rotation direction of the rotor.

7. A turbomachine comprising:
a rotor having an impeller;
a bearing which rotatably supports the rotor;
a casing which contains the rotor therein and forms a stationary flow passage; and
a shaft sealing device which reduces leakage of a working fluid through a gap part between the casing and the rotor, wherein
the working fluid is a liquid,
an axial groove group which includes a plurality of rectangular axial grooves which have been intermittently arranged on the same straight line directed in an axial direction with a land part having a thickness corresponding to at least half of a length of the rectangular axial grooves being interposed between the adjacent rectangular axial grooves is provided in an inner circumferential surface of the shaft sealing device,
a plurality of the axial groove groups are adjacently arranged in the circumferential direction, and the plurality of axial groove groups which have been adjacently arranged in the circumferential direction are arranged so as to be parallel with one another with the land part being interposed between the adjacent axial groove groups, the plurality of rectangular axial grooves which configure each of the axial groove groups are configured by rectangular grooves of a plurality of sizes which are mutually different in length in the axial direction, and the plurality of rectangular axial grooves which configure each of the axial groove groups are configured by small rectangular grooves and large rectangular grooves which are mutually different in length in the axial direction, and one large rectangular groove is arranged every time the plurality of small rectangular grooves are arranged in the axial direction.

8. The turbomachine according to claim 6, wherein the plurality of rectangular axial grooves are arranged in a staggered state at least in one direction of the axial direction and the circumferential direction of the rotor.

9. The turbomachine according to claim 8, wherein the plurality of rectangular axial grooves are arranged in the staggered state in the axial direction of the rotor and the rectangular axial grooves which are arranged in the staggered state are configured so as to partially overlap one another in the axial direction.

* * * * *